United States Patent [19]
Imai

[11] Patent Number: 5,923,345
[45] Date of Patent: *Jul. 13, 1999

[54] MULTI-PRINTING-MODE CONTROL CIRCUIT FOR AN INK EJECTING PRINTING APPARATUS

[75] Inventor: Koji Imai, Nagoya, Japan

[73] Assignee: Brother Kogyo Kabushiki Kaisha, Nagoya, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/530,468

[22] Filed: Sep. 19, 1995

[30] Foreign Application Priority Data

| Sep. 26, 1994 | [JP] | Japan | 6-257667 |
| Jan. 9, 1995 | [JP] | Japan | 7-001084 |
| Apr. 27, 1995 | [JP] | Japan | 7-103387 |

[51] Int. Cl.⁶ .................................................. B41J 29/38
[52] U.S. Cl. ................................................... 347/11
[58] Field of Search ..................... 347/10–11, 15

[56] References Cited

U.S. PATENT DOCUMENTS

| 3,946,398 | 3/1976 | Kyser et al. . | |
| 4,115,788 | 9/1978 | Takano et al. | 346/75 |
| 4,723,129 | 2/1988 | Endo et al. . | |
| 4,879,568 | 11/1989 | Bartky et al. . | |
| 5,032,851 | 7/1991 | Yoshimura | 346/140 R |
| 5,198,833 | 3/1993 | Kubota | 346/1.1 |
| 5,594,478 | 1/1997 | Matsubara et al. | 347/41 |
| 5,600,351 | 2/1997 | Holstun et al. | 347/40 |
| 5,602,572 | 2/1997 | Rylander | 347/15 |

Primary Examiner—Eddie C. Lee
Assistant Examiner—John Chizmar
Attorney, Agent, or Firm—Oliff & Berridge, PLC

[57] ABSTRACT

An ink ejecting printing apparatus is capable of selectively changing between a first printing mode, in which two driving signals are output for each pulse signal output, and a second printing mode, in which one driving signal is output for each pulse signal. When the first printing mode is set, the nozzles are driven by two driving signals during each data cycle. When the second printing mode is set, the nozzles are driven by a single driving signal during each data cycle.

33 Claims, 13 Drawing Sheets

MULTI-PRINTING-MODE CONTROL CIRCUIT FOR AN INK EJECTING PRINTING APPARATUS

BACKGROUND OF THE INVENTION

1. Field of the Invention

This invention relates to an ink ejecting printing apparatus formed using a piezoelectric ceramic. In particular, this invention relates to an ink ejecting printing apparatus which prints characters in different grades of resolution or modes by controlling the application of a voltage to the piezoelectric ceramic.

2. Description of the Related Art

Among non-impact-type printing heads which are conventional impact-type printing heads, ink-ejecting-type printing heads generally have the simplest operating principles and are best suited for multi-level printing and color printing. In particular, among the ink-ejecting-type printing heads, a drop-on-demand-type printing head which ejects ink drops only on demand is prevailing in the market because of its good ejecting efficiency and low running cost.

Typical drop-on-demand-type non-impact printing systems include a Kyser-type printing system, as disclosed in U.S. Pat. No. 3,946,398, and a thermal-ejecting-type printing system, as disclosed in U.S. Pat. No. 4,723,129. However, these systems have a number of difficult problems. The Kyser-type printhead has a problem in that it is difficult to miniaturize. The thermal-ejecting-type printing head has a problem in that a heat-tolerant ink is required, since a high temperature is applied to the ink. Therefore, as a new system to solve both of the above-mentioned problems simultaneously, an ink ejecting printing apparatus using a shearing-mode-type printing head, as disclosed in U.S. Pat. No. 4,879,568, has been proposed.

In the shearing-mode-type ink ejecting printing apparatuses, in general, a number of printing modes can be set, including: a normal printing mode; an ink saving printing mode; a high-speed printing mode, and a high-quality printing mode. In the normal printing mode, printing is performed by ejecting ink drops out of a nozzle in a 1:1 ratio to the respective dot printing signals of the printing data. In the ink saving printing mode, printing is performed by deleting a predetermined number of dots from the total number of dots to be printed based on the respective dot printing signals. In the high-speed printing mode, printing is performed by ejecting ink drops by deleting a predetermined number of dots from the total number of dots to be printed based on the respective dot printing signals and by moving the printing head relative to a printing paper at a faster scanning speed than the scanning speed used in the normal printing mode. In the high-quality printing mode; printing is performed at twice the resolution used in the normal printing mode.

However, there is a problem associated with the ink saving printing mode and the high speed printing mode in a conventional ink ejecting printing apparatus. In the conventional ink ejecting printing apparatus, as shown in FIG. 18, the pitch between dots in the main scanning direction and the pitch between dots in sub-scanning direction are the same. Accordingly, when an ink saving mode is set, if the predetermined number of ink dots are deleted simply by deleting every other dot, void points are produced, as shown in FIG. 19. In order to print in the ink saving mode without creating void points, a complicated process is needed, which can increase the cost of the ink ejecting printing apparatus.

In an ink ejecting printing apparatus there is also a problem associated with changing between the normal and high-quality modes in which both the normal mode and a high quality mode can be set. When printing in the normal printing mode, as shown in FIG. 20, the pitch between dots in the main scanning direction is the same as the pitch between dots in the sub-scanning direction. When printing in the high quality mode, the pitch between dots in both main scanning and sub-scanning directions is ½ the pitch between dots in the normal printing mode, but the proper ink quantity is difficult to control. Therefore, when printing in the high quality mode, as shown in FIG. 21, the dot diameter becomes too large when an ink drop impacts the printing paper. Thus, a desired quality, which is expected in the high quality mode, cannot be obtained. Because of this, when printing in the high quality mode, a special printing paper, on which ink runs less than on a normal printing paper, is used to keep the dot diameter small. However, the special paper is very expensive and the running cost of the ink ejecting printing apparatus increases significantly.

SUMMARY OF THE INVENTION

Therefore, this invention provides an ink ejecting printing apparatus which is able to print in a plurality of different printing modes using a common memory without increasing the storage capacity of a necessary memory for storing the printing data, and is able to avoid missing a printing dot.

This invention also provides an ink ejecting printing apparatus which is able to execute high speed printing without missing any of the dots which form characters, etc.

This invention further provides an ink ejecting printing apparatus which is able to create high quality printing at a plurality of different resolutions.

In order to provide the above-outlined ink ejecting printing apparatus, the ink ejecting printing apparatus according to this invention comprises an ink ejecting printing head having a plurality of nozzles for ejecting ink drops; a pulse signal output means for outputting a pulse signal based on respective dot printing signals of printing data containing a plurality of dot printing signals; a printing mode setting means which sets a first printing mode in which a first plurality of driving signals for different impact points of ink drops are output corresponding to a pulse signal output from the pulse signal output means or a second printing mode in which a second plurality of driving signals are output, the second plurality of driving signal being smaller than the first plurality of driving signals; and a nozzle driving means for driving respective ones of the nozzles based on the first plurality of driving signals when the first printing mode is set by the printing mode setting means, and for driving respective ones of the nozzles based on the second plurality of driving signals when the second printing mode is set by the printing mode setting means.

In ink ejecting printing apparatus according to this invention as described above, the first printing mode or the second printing mode is set through the printing mode setting means. When the first printing mode is set by the printing mode setting means, driving signals for different impact points of ink drops are output corresponding to a pulse signal output from the pulse signal output means based on respective dot printing signals of the printing data, and respective ones of the nozzles are driven by the nozzle driving means based on the driving signals. Thus, when the first printing mode is set, ink drops having different impact points are ejected out of respective nozzles corresponding to one pulse signal and high quality printing of characters, etc. can be performed.

When the second printing mode is set by the printing mode setting means, driving signals, smaller in number than in the first printing mode, are output corresponding to one pulse signal output from the pulse signal output means based on respective dot signals, and respective ones of the nozzles are driven by the nozzle driving means based on the driving signals. Thus, when the second printing mode is set, an ink drop is ejected out of each nozzle corresponding to driving signals which are smaller in number than in the case of the first printing mode, and printing is performed without missing any of the dots forming the characters and the like.

These and other features and advantages of the invention are described in or apparent from the following detailed description of the preferred embodiments.

BRIEF DESCRIPTION OF THE DRAWINGS

The preferred embodiments of this invention will be described in detail with reference to the following figures, wherein.

DETAILED DESCRIPTION OF THE PREFERRED EMBODIMENTS

Figure 1:
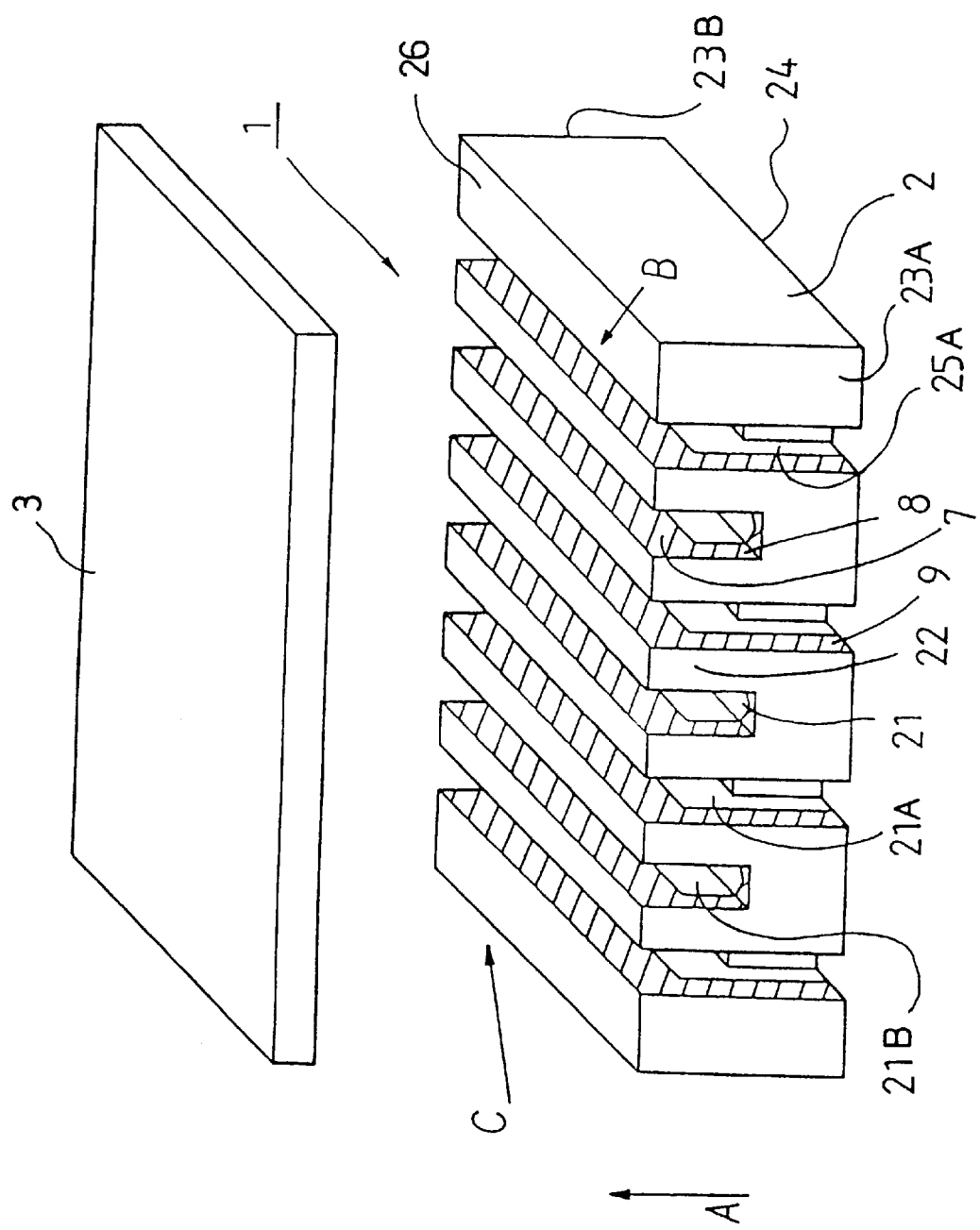
FIG. 1 is a front perspective view showing a piezoelectric ceramic plate and a cover plate of the preferred embodiment of a printhead of an ink ejecting printing apparatus of this invention.
Figure 2:
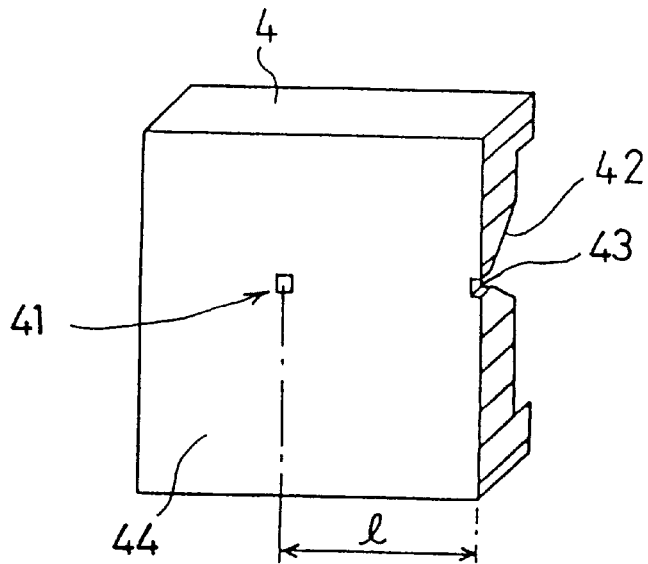
FIG. 2 is a partial cross-sectional perspective view of a nozzle plate of the preferred embodiment of the printhead of the ink ejecting printing apparatus of this invention.
Figure 3:
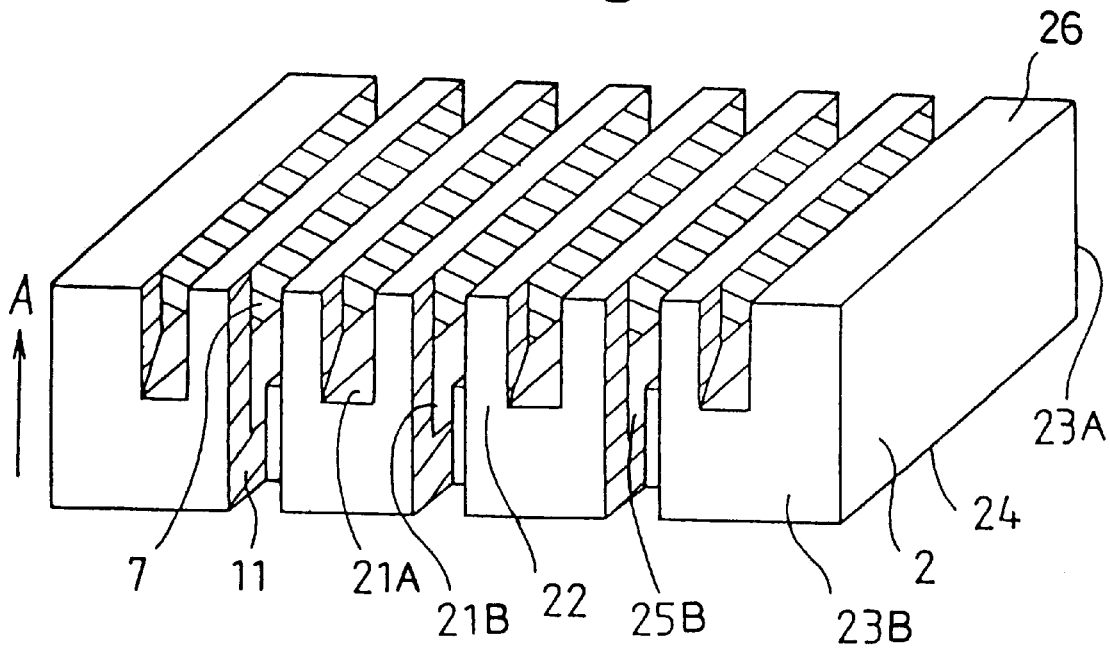
FIG. 3 is a back perspective view of the piezoelectric ceramic plate of the preferred embodiment of the printhead of the ink ejecting printing apparatus of this invention.
Figure 4:
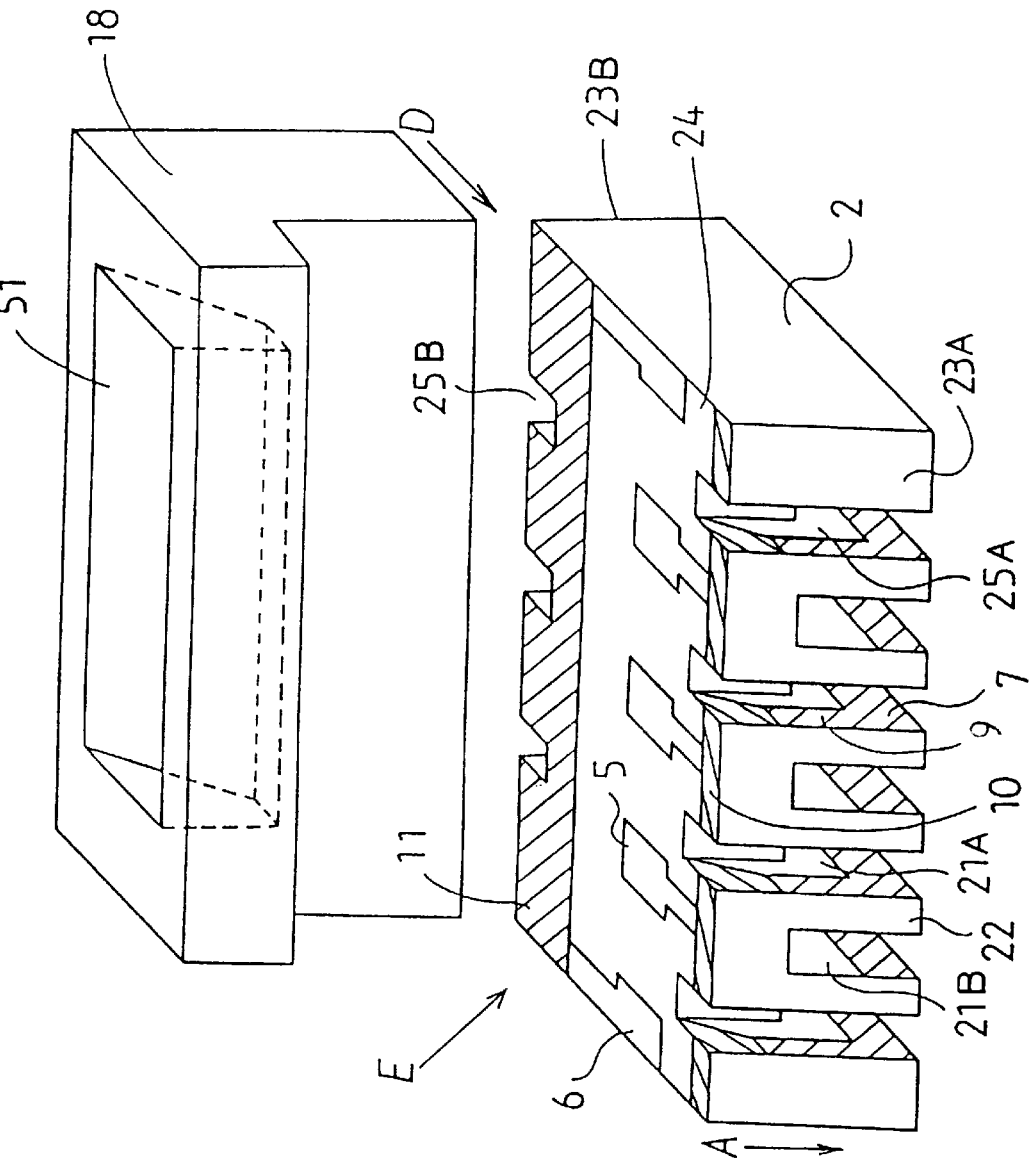
FIG. 4 is a bottom perspective view of the piezoelectric ceramic plate and a manifold member of the preferred embodiment of the printhead of the ink ejecting printing apparatus of this invention.

FIGS. 1–4 show an ink ejecting printhead 1 of a piezoelectric system. The ink ejecting printhead 1 includes a piezoelectric ceramic plate 2, a cover plate 3, a nozzle plate 4, as shown in FIG. 2, and a manifold member 18, as shown in FIG. 4.

The piezoelectric ceramic plate 2 is formed from a ceramic material, such as lead titanate-zirconate (PZT). The piezoelectric ceramic plate 2 has a plurality of lateral grooves 21 separated by a plurality of partition walls 22 machined into a surface of the ceramic plate 2 by a diamond blade or the like. The partition walls 22 form the side surfaces of the lateral grooves 21 and are polarized in the direction of an arrow A. Each of the plurality of lateral grooves 21 has the same depth. The plurality of lateral grooves 21 are parallel to each other. The plurality of lateral grooves 21 extend between the opposing front end surface 23A and back end surface 23B of the piezoelectric ceramic plate 2.

Vertical grooves 25A are formed in the front end surface 23A for every other lateral groove 21. Each vertical groove 25A connects to a corresponding one of the lateral grooves 21. Vertical grooves 25B are formed in the back end surface 23B for every other lateral groove 21. Each vertical groove 25B connects to a corresponding one of the lateral grooves 21. The vertical grooves 25A and 25B connect to alternate ones of the plurality of lateral grooves 21, as shown in FIGS. 1 and 3. In addition, a vertical groove 25A is provided at each of the lateral grooves 21 at the left and right ends of the piezoelectric ceramic plate 2. As shown in FIG. 4, wiring patterns 5 and 6 are formed on the bottom surface 24 of the piezoelectric ceramic plate 2.

As shown in FIGS. 1, 3 and 4, a plurality of metallic electrodes 7, 8, and 9 are formed in the lateral grooves 21 and the vertical grooves 25. The metallic electrodes 7–9 are formed by sputtering devices or the like, which are located at positions off to the upper left and right of the machined surface 26 and the end surface 23A of the piezoelectric ceramic plate 2. That is, the electrodes 7–9 are formed from sputtered material arriving from the directions of arrow marks B and C. The end surface 23A and the tops of the partition walls 22 of the piezoelectric ceramic plate 2 are masked to prevent the metallic electrodes 7–9 from forming on them.

As shown in FIG. 1, the metallic electrodes 7 are formed in the upper half area on both sides of each of the plurality of lateral grooves 21. The metallic electrodes 8 are formed on a portion of the bottom surface and on a portion of the side surface of the lateral grooves 21 near the end surface 23A for the lateral grooves not connected to one of the longitudinal grooves 25A. The metallic electrodes 9 are formed on the side surface of the longitudinal grooves 25A near the side of the end surface 23A. Thus, as shown in FIG. 1, the metallic electrode 7 and the metallic electrode 8 are electrically connected to each other, and the metallic electrode 7 and the metallic electrode 9 are electrically connected to each other.

Next, as shown in FIG. 4, a plurality of metallic electrodes 10 and a metallic electrode 11 are formed on the bottom surface 24. The metallic electrodes 10 and 11 are formed by sputtering devices or the like, which are located at positions to the lower left and right of the bottom surface 24 and the end surface 23B of the piezoelectric ceramic plate 2. That is, the electrodes 10 and 11 are formed from sputtered material arriving from the directions D and E. The end surface 23B and the bottom surface 24 of the piezoelectric ceramic plate 2 are masked to prevent the forming of the metallic electrodes 10 and 11 on the wiring patterns 5 and 6.

Each metallic electrode 10 is formed on the bottom portion of the vertical grooves 25A near the bottom surface 24 and a portion of the bottom surface extending between the vertical grooves 25A. Therefore, each metallic electrode 10 is also formed over a portion of the metallic electrode 9 formed in the vertical grooves 25A. The metallic electrode 10 formed on the side surface of the vertical grooves 25A is thus electrically connected to the metallic electrode 7 through the metallic electrode 9.

Accordingly, a metallic electrode 7 formed on a particular partition wall 22, which forms a side of the lateral groove 21A connected to a corresponding vertical groove 25A, is electrically connected to a metallic electrode 7, which is formed on another partition wall 22, with a lateral groove 21B formed between the partition walls 22. Each metallic electrode 10 is also electrically connected to the wiring pattern 5.

As shown in FIGS. 3 and 4, the metallic electrode 11 is formed on the bottom portion of the vertical grooves 25B and in the area from the center of the piezoelectric ceramic plate 2 towards the end surface 23B, the whole inner side surface of the vertical grooves 25B, and on the end surface 23B side of the vertical grooves 25B. The metallic electrode 11 is also formed over the metallic electrode 7 in the lateral grooves 21B, which is connected to the vertical grooves 25B, and the metallic electrode 7 is electrically connected to the metallic electrode 11. Thus, every metallic electrode 7 in the lateral grooves 21B are connected to one another by the metallic electrode 11. The metallic electrode 11 is also electrically connected to the wiring pattern 6.

Figure 5:
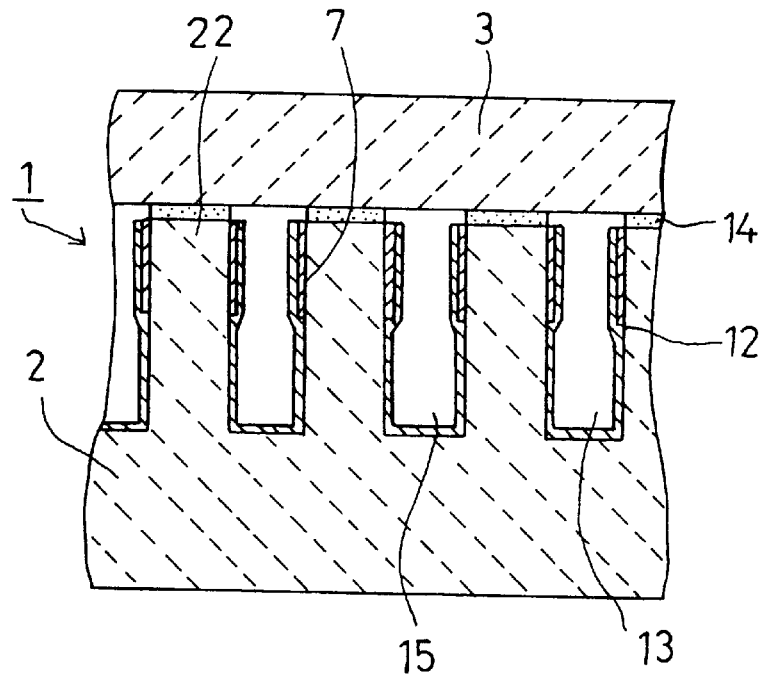
FIG. 5 is a cross-sectional view of a part of the printhead of the preferred embodiment of the ink ejecting printing apparatus of this invention.

As shown in FIG. 5, at least the metallic electrodes 7, 8 and 11 on the piezoelectric ceramic plate 2 are covered with a protective film 12 of epoxy resin by a spin-coat method. Organic materials, such as acrylic resin using a dipping method, a CVD method, or the like, or with an inorganic material, such as $SiO_2$, can be used in addition to or instead of the epoxy resin using the spin-coat method to cover the electrodes 7, 8 and 11 with a protective film.

The cover plate 3 is formed from a ceramic material, a glass material or a resin material. The cover plate 3 and the top surface 26 of the piezoelectric ceramic plate 2 are glued to each other using an epoxy resin adhesive 14. Therefore, in the ink ejecting printhead 1, the upper surface 26 of the lateral grooves 21 is covered to form ink chambers 15 communicating with the vertical grooves 25B and air chambers 13, as a non-ejecting portion, communicating with the vertical grooves 25A. The ink chambers 15 correspond to the lateral grooves 21B and the air chambers 13 correspond to the lateral grooves 21A. The ink chambers 15 and the air chambers 13 each have a rectangular cross-section and thin, long shapes. All of the ink chambers 15 are filled with ink and all of the air chambers 13 are filled with air.

However, those metallic electrodes 7 which are formed in the lateral grooves 21A and connect to the metallic electrodes 9 to form the air chambers 13 do not come into contact with the ink. Thus, it is not necessary to cover those metallic electrodes 7 with the protective cover 12.

As shown in FIG. 2, a nozzle plate 4 is provided with a plurality of nozzles 41. Each nozzle 41 is formed at a position corresponding to one of the ink chambers 15. The nozzle plate 4 is glued to the end surface 23A of the piezoelectric ceramic plate 2 and on an end surface of the cover plate 3. Each nozzle 41 formed on the nozzle plate 4 includes a tapered portion 42 and an orifice 43, as shown in FIG. 2. A water-repellent film is provided on an ink-ejecting-side surface 44 of the nozzle plate 4. The nozzles 41 are disposed at a center-to-center pitch of 308 $\mu$m and are arranged a straight line.

As shown in FIG. 4, the manifold member 18 is glued to the end surfaces 23B and the bottom surface 24 of the piezoelectric ceramic plate 2. A manifold 51 is formed in the manifold member 18. The manifold 51 connects to the longitudinal grooves 25B at the bottom surface 24 of the ceramic plate 2.

The wiring patterns 5 and 6 formed on the bottom surface 24 of the piezoelectric ceramic plate 2 are connected to a wiring pattern of a flexible printed substrate (not shown). The wiring pattern of the flexible printed substrate is connected to a rigid substrate (not shown) which is connected to a control device (see FIGS. 8 and 14) of the ink ejecting printing apparatus.

Figure 7:
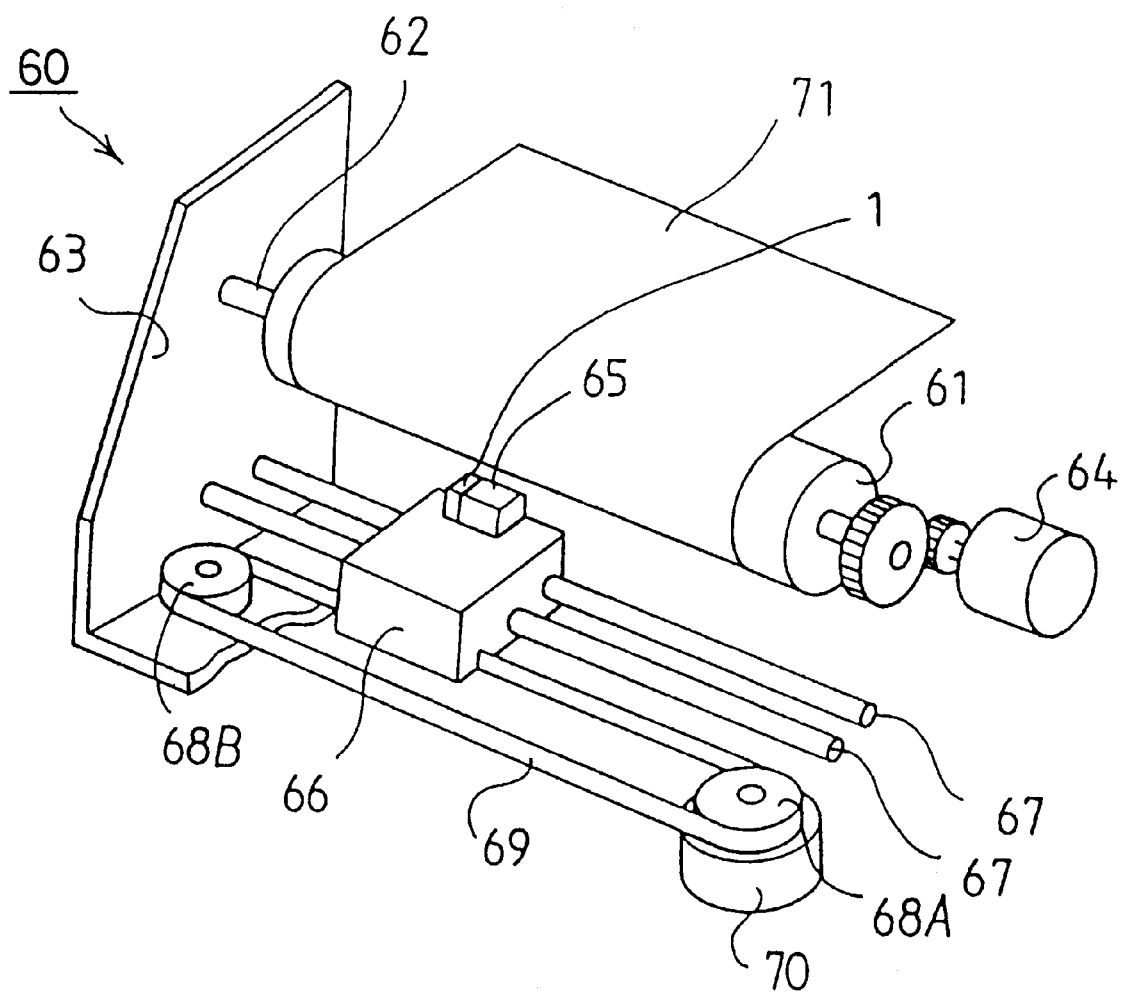
FIG. 7 is a perspective view of a portion of the ink ejecting printing apparatus of this invention.

As shown in FIG. 7, the ink ejecting printhead 1 of a piezoelectric system forms an essential portion of a printer 60. The printer 60 includes a platen 61 which is rotatably fixed to the frame 63 through a shaft 62. The platen 61 is driven by a platen motor 64. The ink ejecting printhead 1 is provided opposite to the platen 61. The piezoelectric ink ejecting printhead 1 is placed on a carriage 66 together with an ink cartridge 65. The carriage 66 is slidably supported on a pair of guide rods 67, which are positioned in parallel to the shaft 62 of the platen 61. The carriage 65 is coupled to a timing belt 69, which is wound around a pair of pulleys 68A and 68B. The pulley 68A is rotated by a carriage motor 70. Thus, due to the movement of the timing belt 69, the carriage 66 is moved in a main scanning direction relative to a printing paper 71 supported by the platen 61.

Figure 8:
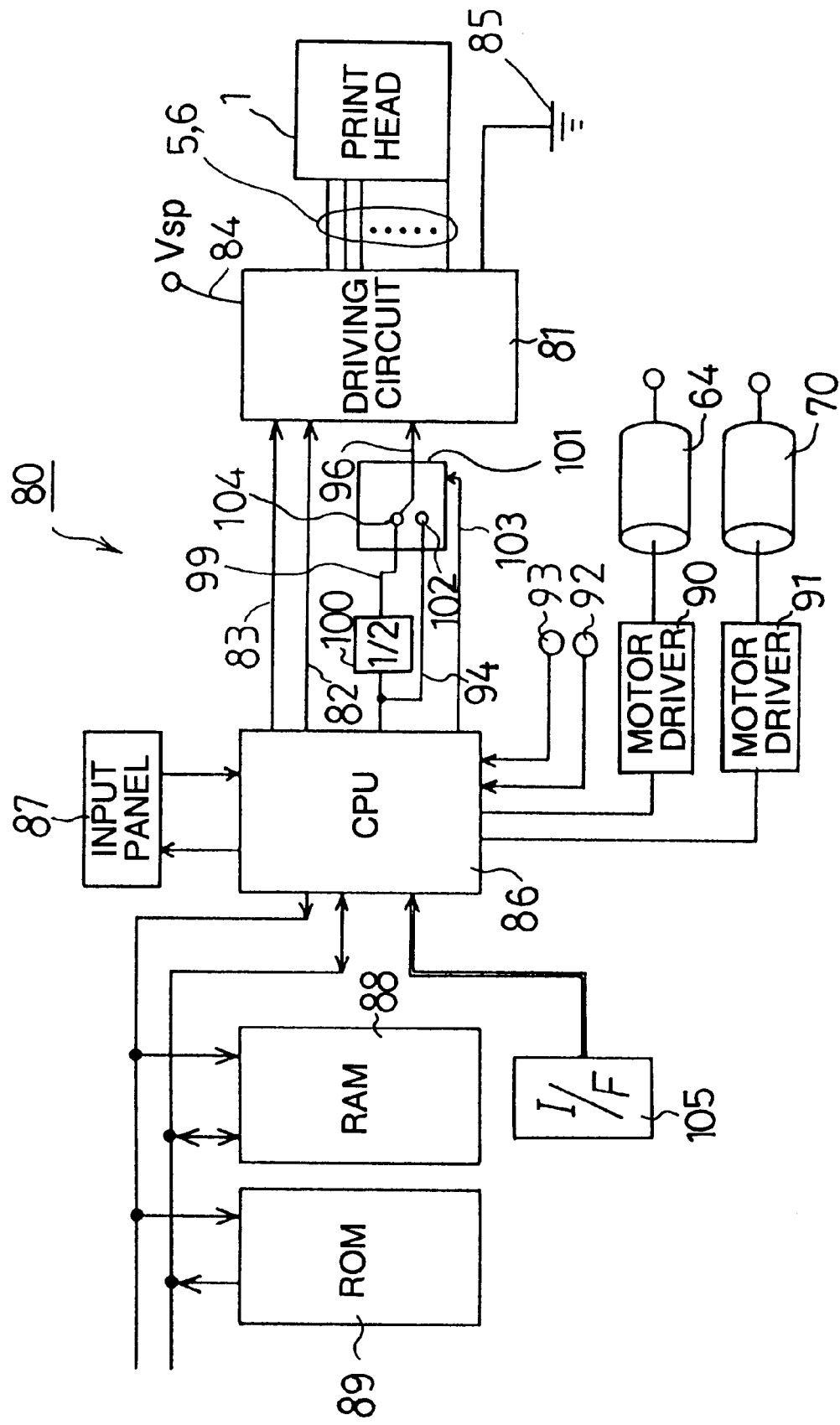
FIG. 8 is a block diagram of a first preferred embodiment of a control device of the ink ejecting printing apparatus of this invention.

FIG. 8 shows a first preferred embodiment of a control device 80 for operating the ink ejecting printhead 1. The wiring patterns 5 and 6 formed on the bottom surface 24 of the piezoelectric ceramic plate 2 are connected to a driving circuit 81 of the control device 80. A clock pulse line 82 for transmitting a clock pulse signal which controls the driving of the ink ejecting printhead 1, a data line 83 for transmitting input printing data in synchronization with the clock pulse signal, a voltage line 84 for supplying a voltage, and an ground line 85 are also connected to the driving circuit 81.

The other ends of the clock pulse line 82 and the data line 83 are connected to a microcomputer (CPU) 86.

Also connected to the microcomputer 86 are an input panel 87 through which an operator inputs setting data to change a set printing mode between the normal printing mode and the ink saving mode, a RAM 88 for temporarily storing data input from the input panel 87, a ROM 89 for storing printing patterns for characters and the like, motor drivers 90 and 91 for driving the platen motor 64 and the carriage motor 70, a paper sensor 92 for detecting the location in the main scanning direction or in the sub-scanning direction of a fed-in printing paper, and an origin sensor 93 for detecting whether the scanning starting position of the piezoelectric ink ejecting printhead 1 is at an origin of a printing paper 71.

Figure 14:
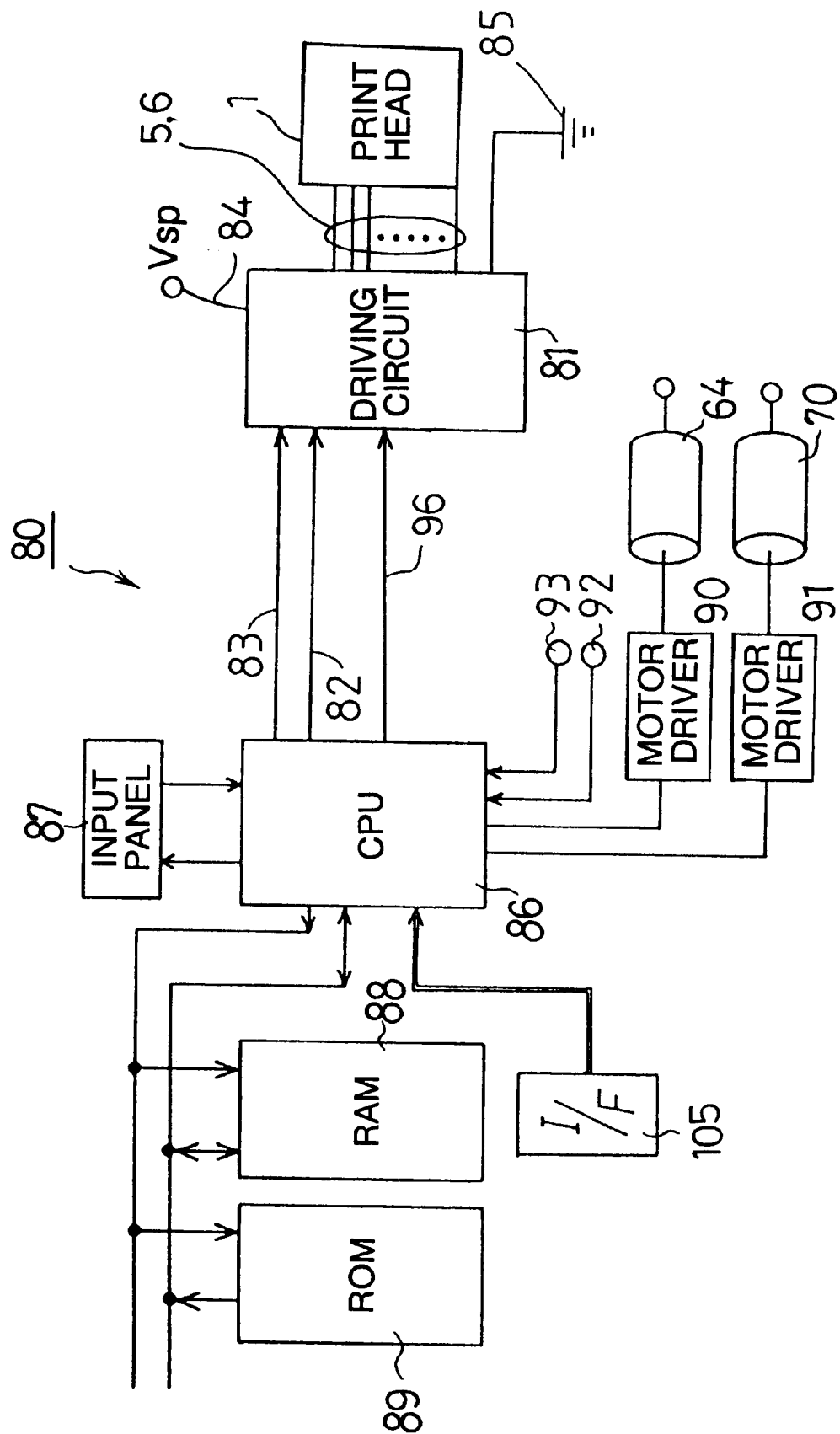
FIG. 14 is a block diagram of the second preferred embodiment of the control device of the ink ejecting printing apparatus of this invention.

As shown in FIGS. 8 and 14, the CPU 86 is preferably implemented by a programmed general purpose microcomputer or microprocessor. However, the CPU 86 can also be implemented on a programmed microcontroller, with or without peripheral integrated circuit elements, an ASIC or other integrated circuit, a hardwired electronic or logic circuit such as a discrete element circuit, a programmable logic device such as a PLD, PLA or PAL, or the like.

A first fire clock signal line 94 is also connected to the microcomputer 86. A modulator 100 is connected to a second end of the first clock signal line 94. A setting switch 101 is provided at another end of the first fire clock signal line 94. The first fire clock signal line 94 is connected to a first terminal 102 of the setting switch 101. The modulator 100 modulates the frequency of a fire clock signal output from the microcomputer 86 to reduce its frequency by one-half. A second fire clock signal line 99 is connected between the modulator 100 and a second terminal 104 of the setting switch 101. The output of the setting switch 101 is connected to a common line 96, which is also connected to the driving circuit 81.

When a setting signal is input to the setting switch 101 from the microcomputer 86 through a setting signal line 103, the first fire clock signal line 94 and the common fire clock signal line 96 are connected to each other through the setting switch 101, or the second fire clock signal line 99 and the common fire clock signal line 96 are connected to each other through the setting switch 101. The microcomputer 86 outputs a setting signal to the setting signal line 103 based on the setting of the normal printing mode or the ink saving printing mode by the operator through the input panel 87.

For example, when the ink saving printing mode is set by the operator through the input panel 87, the setting switch 101 is switched to the side of the switch terminal 104 by a setting signal from the setting signal line 103, and the second fire clock signal line 99 and the common fire clock signal line 96 are connected to each other. In this case, since the modulator 100 is connected between the first fire clock signal line 94 and the second fire clock signal line 99, a fire clock signal output from the common fire clock signal line 96 to the driving circuit 81 is a modulated signal having a halved frequency compared to the frequency of the signal of the first fire clock signal line 94.

When the normal printing mode is set by the operator through the input panel 87, the setting switch 101 is switched to the side of the switch terminal 102 by a setting signal from the setting signal line 103, and the first fire clock signal line 94 and the common fire clock signal line 96 are connected to each other. In this case, the frequency of the fire clock signal output from the common fire clock signal line 96 to the driving circuit 81 is not modulated, different from the above-mentioned ink saving printing mode, so that the frequency is the same as that of the clock signal from the microcomputer 86.

Figure 9:
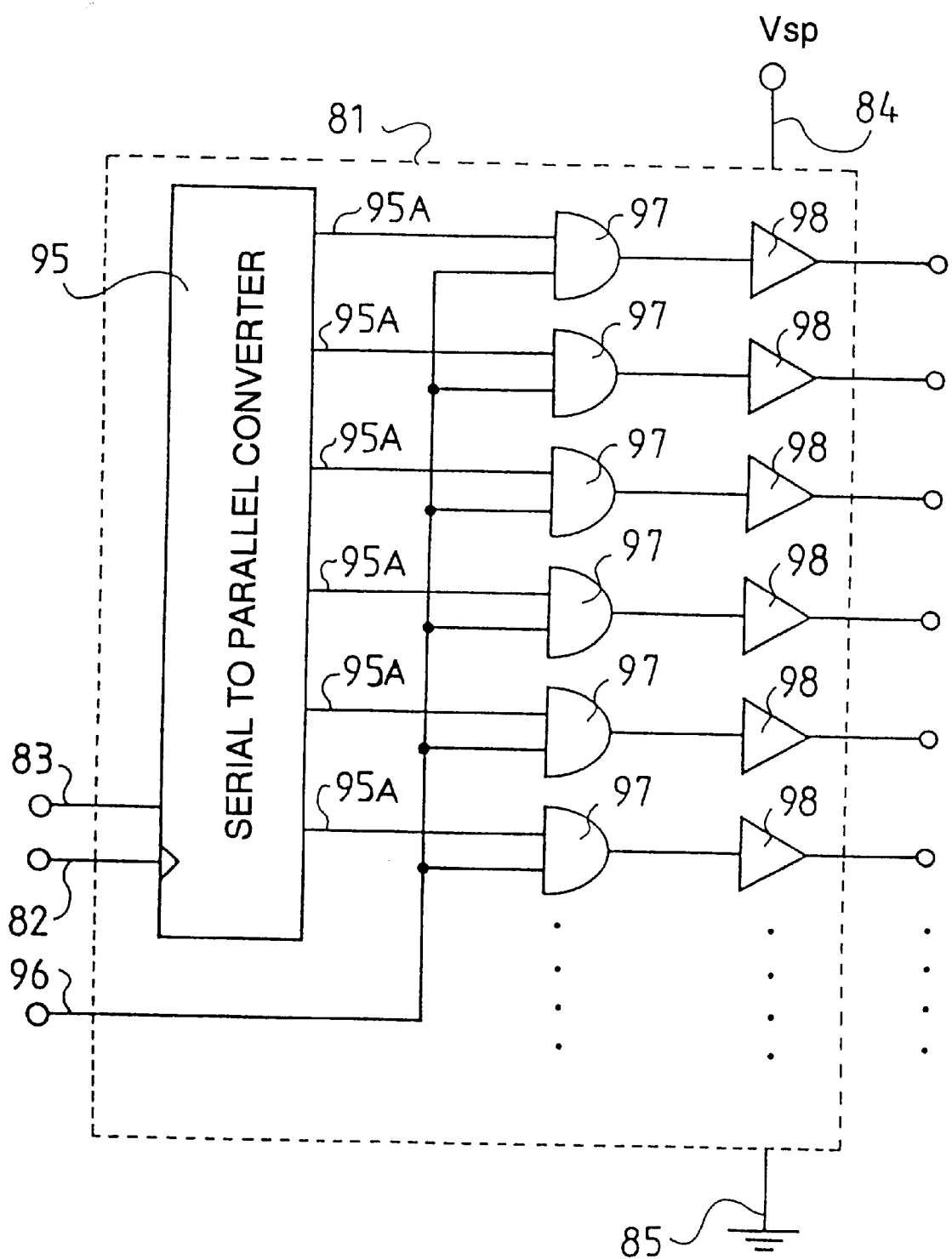
FIG. 9 is a block diagram of the driving circuit of the first preferred embodiment of the control device of the ink ejecting printing apparatus of this invention.

FIG. 9 shows a block diagram of the driving circuit 81. In the driving circuit 81 as shown in FIG. 9, both the clock pulse signal line 82 and the data line 83 are connected to a serial-to-parallel converter 95. The serial-to-parallel converter 95 converts a serial signal (a dot printing signal) output on the data line 83 from the CPU 86 into a parallel signal, based on the clock pulse signal input on the clock pulse line 82. Each one of the output lines 95A corresponds to a respective one of the nozzles 41 and is connected between the serial-to-parallel converter 95 and a corresponding one of the two-input AND circuits 97. That is, each output line 95A is connected to one input of a corresponding AND circuit 97.

The common fire clock signal line 96, which inputs the fire clock signal, is connected to the second input terminal of each one of the AND circuits 97. Each AND circuit 97 ANDs together the corresponding parallel signal, which is converted from the serial data signal by the serial-to-parallel converter 95 and output on the corresponding output line 95A and the fire clock signal input on the common fire clock signal line 96 from the setting switch 101 and outputs a fire signal to the corresponding one of the drivers 98 for driving a corresponding one of the nozzles 41. The drivers 98 drive the nozzles 41 to selectively eject ink drops by selectively supplying a predetermined voltage obtained from the voltage line 84 to the electrodes 7–11 of the nozzles 41 based on the fire signal.

Figure 6:
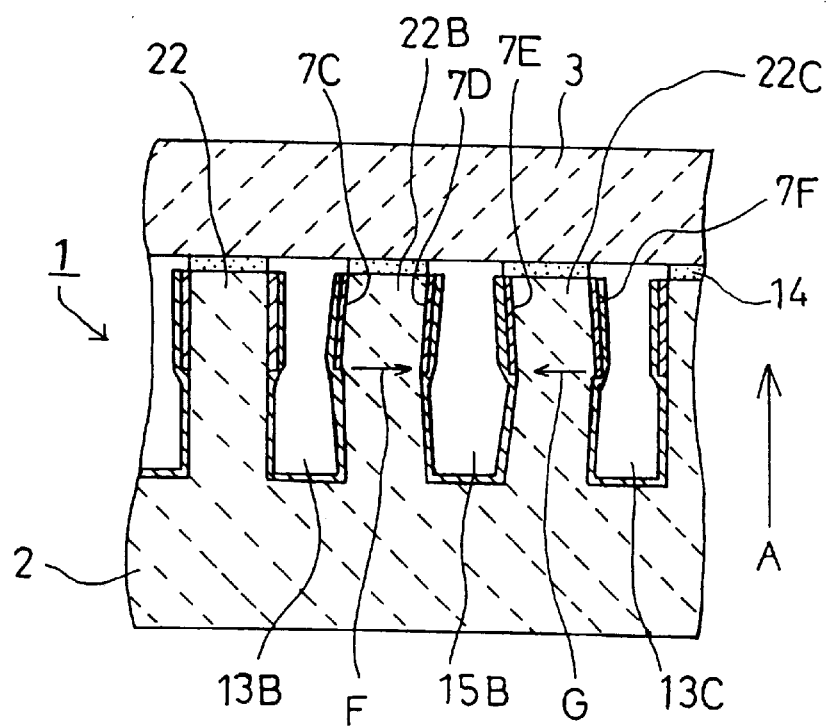
FIG. 6 is another cross-sectional view of a part of the printhead of the preferred embodiment of the ink ejecting printing apparatus of this invention.

As shown in FIG. 6, to eject ink drops out of an ink chamber 15B, voltage pulses are input through the wiring pattern 5 to the metallic electrodes 7C and 7F provided on the side walls of the air chambers 13B and 13C sandwiching the ink chamber 15B. The other metallic electrodes 7D and 7E on the sides of the ink chamber 15B are grounded through the wiring pattern 5 and the wiring pattern 6. As shown in FIG. 6, an electric field in the direction of an arrow F is generated in the partition wall 22B and an electric field in the direction G is generated in the partition wall 22C in the direction of an arrow G. Thus, the partition wall 22B and the partition wall 22C are forced apart from each other. The capacity of the ink chamber 15B is thus increased and the pressure in the ink chamber 15B, including the corresponding nozzle 41, is decreased. Therefore, ink is supplied to the ink chamber 15B from the manifold 51 through the longitudinal groove 25B.

This state is kept in a period of time equal to L/a, where L is the length of the ink chamber 15B and "a" is the acoustic velocity of the ink. L/a is the period of time a pressure wave needs to propagate one way through the ink chamber 15 in the vertical direction (a distance between the vertical groove 25B to the nozzle plate 4).

According to the propagation theory of pressure waves, after a period of time equal to L/a, the pressure in the ink chamber 15B reverses to a positive pressure. In phase with this timing, the supplied voltage to the electrodes 7C and 7F is switched back to 0 volt. Then, the non-positive pressure wave and the pressure produced by the return of the partition walls 22B and 22C to their non-deformed states are added. Thus, a comparatively high pressure is applied to the ink in the ink chamber 15B and the ink drops are ejected out of the corresponding nozzle 41.

In this embodiment of the ink ejecting printhead, a driving voltage is first supplied to increase the capacity of the ink chamber 15B. Then the driving voltage is removed to decrease the capacity of the ink chamber 15B to its natural state and the ink drops are ejected out of the ink chamber 15B. However, it is also possible to supply the driving voltage to first decrease the capacity of the ink chamber 15B to eject ink drops out of the ink chamber 15B, then remove the driving voltage to increase the capacity of the ink chamber 15B to its natural state, with ink supplied into the ink chamber 15B by capillary action.

Next, the driving control when the printhead 1 is driven as described in the above will be explained in reference to FIGS. 10–13. When image data, such as characters, images or the like, is input to the microcomputer 86 by an input means, such as an external host computer, a LAN, a WAN or the like, through a standard parallel interface 105, the data is temporarily stored in the RAM 88. The printing data concerning character data, etc. stored in the RAM 88 is serially sequentially output from the RAM 88 to the CPU 86.

Then, a serial data signal output from the CPU 86 is supplied to the driving circuit 81 through the data line 83. The driving circuit then determines which ones of the nozzles 41 to drive to eject ink drops based on the serial data signal, and applies the voltage Vsp from the voltage line 84 to the wiring pattern 5. The wiring pattern 5 is electrically connected to the metallic electrodes 7 of the air chambers 13 sandwiching the ink chambers 15. Thus, the voltage Vsp is applied to those electrodes 7 corresponding to the air chambers 13 sandwiching the ink chambers 15 corresponding to the nozzles 41 to eject ink drops. The wiring patterns 6 are connected to the ground line 85.

When a normal printing mode has been set through the input panel 87, the setting switch 101 is connected to the switch terminal 102 by a setting signal from the CPU 86. Therefore, the fire clock signal is output to the input terminals of the AND circuits 97 of the driving circuit 81 through the microcomputer 86, the first fire clock signal line 94, and the common fire clock signal line 96. In this case, the fire clock signal is output to respective AND circuits 97 without being modulated. At the same time, the serial data signal, or dot printing signal, supplied on the data line 83 synchronously with the clock pulse signal on the clock pulse line 82 is converted into a parallel signal by the serial-to-parallel converter 95.

Then, the parallel signal is output to the AND circuits 97 on the respective output lines 95A. In each of the respective AND circuits 97, the fire clock signal from the common fire clock signal line 96 and the serial signal from the corresponding output line 95A are ANDed together. Based on the result output by the AND, the fire signal is selectively output to respective ones of the drivers 98. Respective ones of the nozzles 41 are driven by the fire signal to eject ink drops out of the respective ones of the respective nozzles 41 to print characters and the like.

Figure 10:
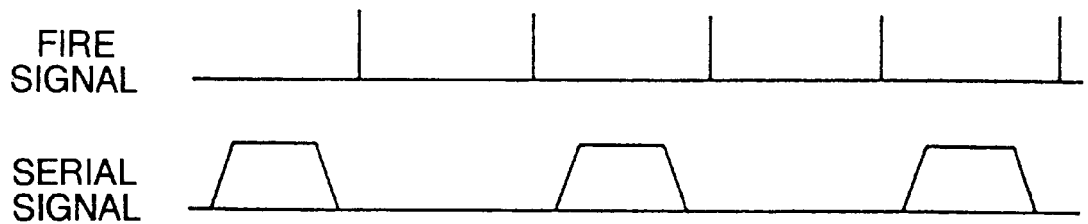
FIG. 10 is a timing chart showing the relation between a serial data signal and a fire signal output to the driver when in the normal printing mode.
Figure 11:
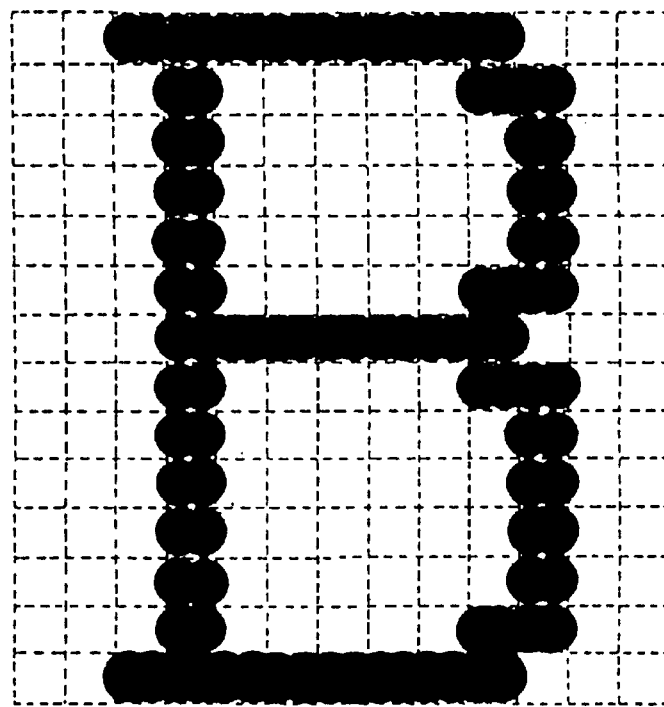
FIG. 11 illustrates a normal-printing-mode printed character formed by the ink ejecting printing apparatus using the first preferred embodiment and a second preferred embodiment of the control device.

The relation between the serial signal and the fire signal is shown in FIG. 10, which is a timing chart showing the serial data signal, or dot printing signal, input on the data line 83 and the fire signal output to the respective drivers 98 when in the normal printing mode. As shown in FIG. 10, two cycles of the fire signal are output from the microcomputer 86 to the respective drivers 98 between a trailing edge of a previous cycle and a leading edge of a next cycle of the serial data signal. In other words, one cycle of the serial data signal and two cycles of the fire signal combine to form one set of printing data. Therefore, two dots are consecutively printed at two points for each set of printing data. The printed result is shown in FIG. 11. Printing is controlled so that the printing dot pitch in the main scanning direction (i.e., along the guide rods 67) is ½ the printing dot pitch in the sub-scanning direction (along the paper feed direction) and is accomplished by controlling the timing of the fire signal and the speed of the carriage 66 along the guide rods 67.

On the other hand, when the ink saving printing mode is set through the input panel 87, the setting switch 101 is connected to the switch terminal 104 by the setting signal output from the CPU 86 on the setting signal line 103. Therefore, the fire clock signal is output to the input terminals of the AND circuits 97 in the driving circuit 81 from the microcomputer 86, the first fire clock signal line 94, the modulator 100, the second fire clock signal line 99 and the common fire clock signal line 96. In this case, the frequency of the fire clock signal is modulated to be one-half the frequency of the original clock signal. The modulated fire clock signal is output to the AND circuits 97.

At the same time, a serial data signal, or dot printing signal, output by the CPU 86 on the data line 83 is converted to a parallel signal by the serial-to-parallel converter 95 synchronously with the clock signal from the clock pulse line 82. Then, the parallel signal is output to the AND circuits 97 through the output lines 95A. In each of the AND circuits 97, the fire clock signal from the common fire clock signal line 96 and the serial data signal from the corresponding output line 95A are ANDed together. Then, based on the results output from the respective AND circuits 97, the fire clock signal is selectively output to respective ones of the drivers 98. The corresponding nozzles 41 are driven by the fire signal to eject ink drops out of respective nozzles 41, to print characters and the like.

Figure 12:
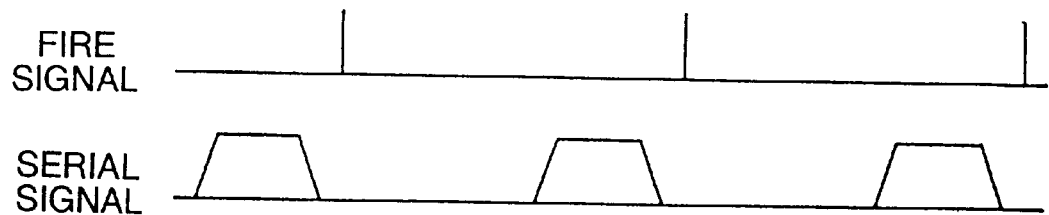
FIG. 12 is a timing chart showing the relation between the serial data signal and the fire signal output to the driver when in ink saving mode and using the first preferred embodiment of the control device.

The relation between the serial data signal and the fire signal is shown in FIG. 12, which is a timing chart showing the relation between the serial data signal input on the data line 83 and the fire signal output to the respective drivers 98 when in the ink saving printing mode. As shown in FIG. 12, one cycle of the fire signal is input from the microcomputer 86 and output to the respective drivers 98 between a trailing edge of a previous cycle of the serial data signal and a leading edge of a next cycle of the serial data signal. In other words, one cycle of serial data signal and one cycle of the fire signal combine to form one set of printing data. Therefore, one dot is printed for each set of printing data.

Figure 13:
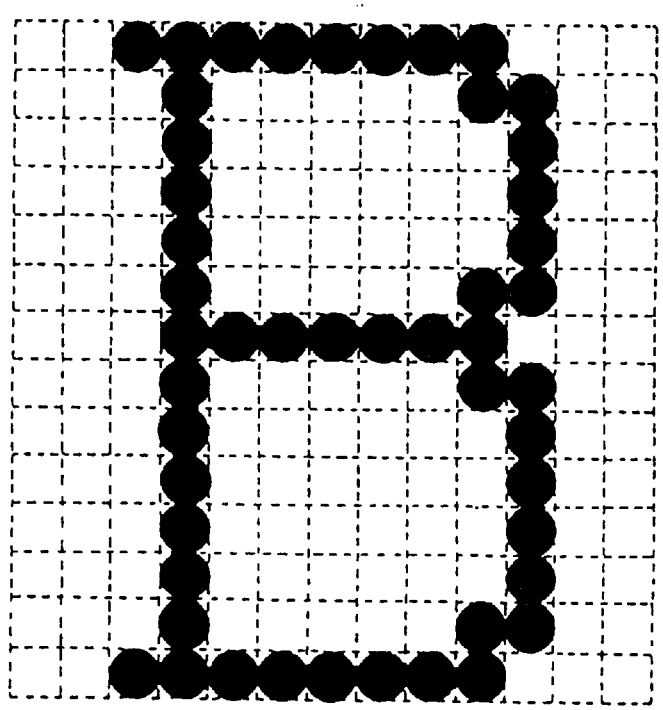
FIG. 13 illustrates a ink-saving-mode printed character formed by the ink ejecting printing apparatus according to the first preferred embodiment of the control device or a high-speed-printing-mode printed character formed by the ink ejecting printing apparatus according to the second preferred embodiment of the control device.

The printed result is shown in FIG. 13. As described above, in the normal printing mode, the carriage speed is controlled so that the printing dot pitch in the main scanning direction is to be ½ the dot pitch in the sub-scanning direction. In the ink saving printing mode, printing is performed so that the printing dot pitch in the main scanning direction is the same as the printing dot pitch in the sub-scanning direction.

As explained in the above, in an ink ejecting printing having a apparatus 60 first preferred embodiment of the control device 80, in the normal printing mode, the resolution in the main scanning direction is double the resolution in the sub-scanning direction. Thus, two cycles of the fire signal are output for each set of printing data. In contrast, in the ink saving printing mode, the resolution in the main scanning direction is the same as that in the sub-scanning direction. Thus, one cycle of the fire signal is output for each set of printing data. Therefore, it is possible to print without any dots missing and without a complicated process or control device.

In the normal printing mode, the resolution in the main scanning direction is double the resolution in the sub-scanning direction. Thus, the quantity of ink necessary for a dot can be reduced, which contributes to the reduction in the ink consumption.

A second preferred embodiment of the control device 80 of a second embodiment of the ink ejecting printing apparatus is shown in FIG. 14. In this second preferred embodiment of the control device 80, only those element which are different from the first preferred embodiment of the control device 80 will be described. The wiring patterns 5 and 6 are connected to the driving circuit 81. The clock pulse line 82, the data line 83, the common fire clock signal line 96, The voltage line 84, and the ground line 85 are also connected to the driving circuit 81. The clock pulse line 82 and the printing data line 83 are connected to the microcomputer 86.

However, in the second preferred embodiment of the control device 80, the common fire clock signal line 96 is connected directly to the CPU 86, rather than to the output terminal of the setting switch 101, as in the first preferred embodiment of the control device 80. Thus, the second preferred embodiment does not include the setting switch 101, the first fire clock signal line 94, the second fire clock signal line 99, the modulator 100 and the setting signal line 103.

The input panel 87, the RAM 88, the ROM 89, the motor drivers 90 and 91, the printing paper sensor 92 and the origin sensor 93 are also connected to the microcomputer 86. The platen motor 64 and the carriage motor 20 are connected to the motor drivers 90 and 91, respectively.

When the normal printing mode is set by the operator through the input panel 87, as shown in FIG. 10, the microcomputer 86 outputs two cycles of the fire signal over the common fire clock signal line 96 to the driving circuit 81 for each cycle of the serial data signal output from the CPU 86 over the data line 83.

Figure 15:
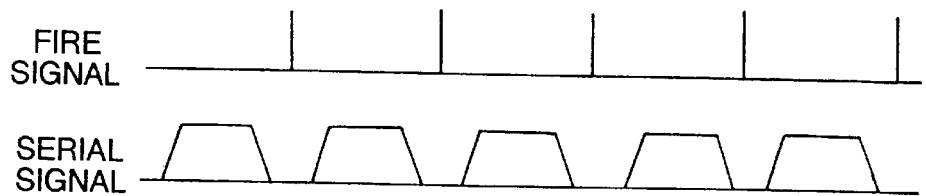
FIG. 15 is a timing chart showing the relation between the serial data signal and the fire signal output to the driver when in the high speed printing mode or when in the high quality printing mode.

When the high speed printing mode is set by the operator through the input panel 87, as shown in FIG. 15, the frequency of the fire clock signal is maintained at the same frequency as in the normal printing mode. However, the frequency at which the serial data signal is output by the CPU 86 is doubled. At the same time, the carriage motor 70 is driven by the motor driver 91 so that the carriage 66 is moved along the guide rails 67 at double the speed at which the carriage 66 is moved in the normal printing mode.

When the normal printing mode is set through the input panel 87, as described above, the fire clock signal is output to the input terminals of the AND circuits 97 of the driving circuit 81 through the common fire clock signal line 96. At the same time, the serial data signal, or dot printing signal, output on the data line 83 is converted into a parallel signal by serial-to-parallel converter 95. Then, the parallel signal is output through output lines 95A to the AND circuits 97. In each of the AND circuits 97, the fire clock signal from the common fire clock signal line 96 and the serial signal from the corresponding output line 95A are ANDed together. Based on the results output from the AND circuits 97, the fire signal is selectively output to the drivers 98. The nozzles 41 are selectively driven by the outputs of the drivers 98 to eject ink drops to print characters and the like.

The relation between the serial signal and the fire signal in the normal printing mode is the same as shown in FIG. 10 and described above with respect to the first preferred embodiment of the control device 80. Thus, this description will not be repeated.

On the other hand, when the high speed printing mode is set through the input panel 87, while the fire clock signal is output to respective AND circuits 97 at the same frequency as in the normal printing mode, the output frequency of the serial data signal is double the output frequency used in the normal printing mode. The serial data signal, or dot printing signal, output on the data line 83 is converted to a parallel signal by the serial-to-parallel converter 95 synchronously with the clock pulse signal on the clock pulse line 82. Then, the parallel signal is output to the AND circuits 97 through the output lines 95A. In each of the AND circuits 97, the fire clock signal from the common fire clock signal line 96 and the serial signal output on the corresponding output line 95A are ANDed together. Based on the results of the AND circuit 97, the fire signal is selectively output to the drivers 98. The nozzles 41 are selectively driven by the drivers 98 to eject ink drops to print characters and the like.

The relation between the serial data signal and the fire signal during the high speed printing mode is shown in FIG. 15, which is a timing chart of the serial data signal, or dot printing signals output on the data line 83 and the fire signal output to the common fire clock signal line 99 to the drivers 98. As shown in FIG. 15, one cycle of the fire signal is output from the microcomputer 88 between the trailing edge of a previous serial data signal cycle and the leading edge of the next serial data signal cycle of the serial data signal. In other words, printing is performed by outputting one cycle of the fire signal for each set of the serial data.

The frequency of the fire signal is the same as that in the normal printing mode. The frequency of the serial data signal in the high speed printing mode is double the frequency of the serial data signal in the normal printing mode. The printed result is shown in FIG. 13. In the normal printing mode, the speed of the carriage 66 is controlled so that the printing dot pitch in the main scanning direction is ½ of the dot pitch in the sub-scanning direction. In the high speed printing mode, the speed of the carriage 66 is double the carriage speed in the normal printing mode. Thus, printing is performed so that the printing dot pitch in the main scanning direction and in the sub-scanning direction is the same.

In the second preferred embodiment of the control device 80 of the ink ejecting printing apparatus, in the normal printing mode the resolution in the main scanning direction is double the resolution in the sub-scanning direction, and two cycles of the fire signal are output for each set of the serial data. In the high speed printing mode, one cycle of the fire signal is output for each set of serial data. However, the carriage speed is increased to make the resolution in the main scanning direction and the resolution in the sub-scanning direction the same. Thereby, printing without missing dots is accomplished without needing a complicated process. In the normal printing mode, since the resolution in the main scanning direction is double the resolution in the sub-scanning direction, the quantity of ink for a dot can be decreased, which contributes to reducing the ink consumption.

In the second preferred embodiment of the control device 80, it is also possible that two cycles of the fire signal are output for a set of serial data in the normal mode, or more than three cycles of fire signal are output for a set of printing data in the normal printing mode. Further, in the high speed printing mode, one cycle of fire signal is output for a set of serial data. However, in the high speed printing mode, as in the first preferred embodiment of the control device 80, a smaller number of cycles of the fire signal than those in the normal printing mode may be output for a set of serial data.

In the second preferred embodiment of the control device, in the high speed printing mode, the frequency of the serial data signal is double the frequency of the serial data signal in the normal printing mode. Similarly, the carriage speed in the high speed printing mode is double the carriage speed in the normal printing mode. In the high speed printing mode, if the frequency of the serial data signal is N times the frequency of the serial signal in the normal printing mode, the carriage speed in the high speed printing mode will be N times the carriage speed in the normal printing mode, where N any real number greater than one.

In the second preferred embodiment of the control device 80, the quantity of ink in the ink drops in the normal printing mode and in the high speed printing mode is the same. However, the ink quantity in the ink drops ejected out in the high speed printing mode can be greater than in the normal printing mode. In this case, it is possible to decrease the degree of difference in the printing quality between the normal printing mode and the high speed printing mode. Thus, the printing quality in the high speed printing mode improved.

While two modes, the normal printing mode and the high speed printing mode, have been described in the second preferred embodiment of the control device 80, a plurality of modes can be provided to enable a large number of printing speeds.

Figure 16:
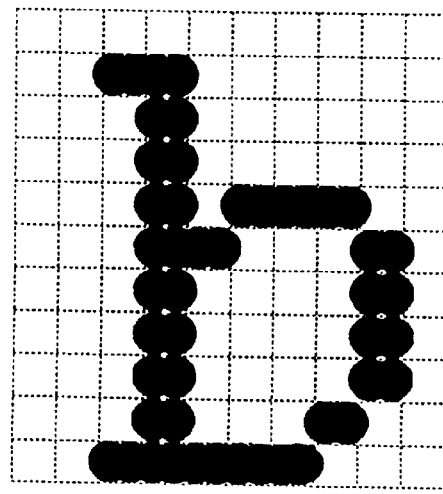
FIG. 16 illustrates a normal-printing-mode printed character formed by the ink ejecting printing apparatus using the second preferred embodiment of the control device.

The second preferred embodiment of the control device 80 can also be operated to provide a high quality printing mode. FIG. 16, which is similar to FIG. 11, shows a printed character printed using the normal printing mode described above and shown in FIG. 10. The printed result is shown in FIG. 16. The printing is performed by controlling the dot pitch in the main scanning direction so that it is ½ of the dot pitch in the sub-scanning direction, and is accomplished by adjusting the timing of the fire signal and the speed of the carriage as described above.

On the other hand, when the high quality mode having the second resolution is set through the input panel 87, as shown in FIG. 15, the frequency of the fire signal is the same as that in the normal printing mode, and output frequency of the serial data signal is double the output frequency of the serial data signal in the normal printing mode. As shown in FIG. 15, one cycle of the fire signal is output from the microcomputer 88 between a trailing edge of a previous cycle of the serial data signal and the leading edge of the next cycle of the serial data signal. The frequency of the fire signal is the same as that in the normal printing mode.

Figure 17:
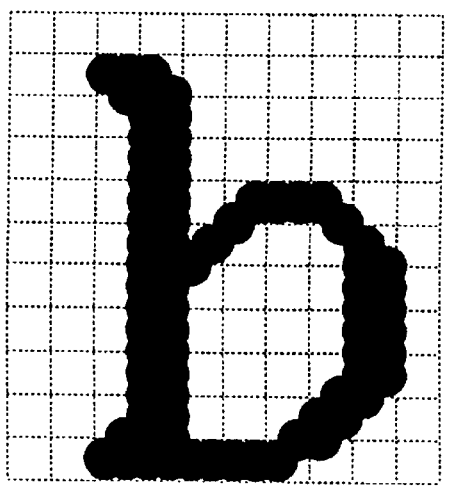
FIG. 17 illustrates a high-quality-printing-mode printed character formed by the ink ejecting printing apparatus using the second preferred embodiment of the control device.
Figure 18:
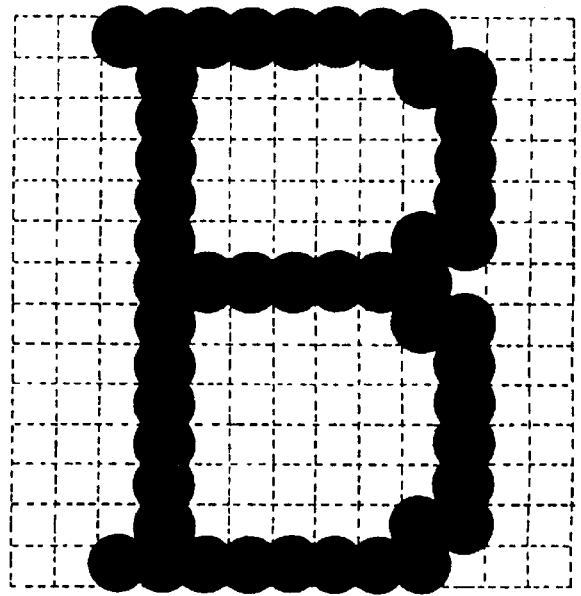
FIG. 18 illustrates a normal-printing-mode printed character formed by a convention ink ejecting printing apparatus.
Figure 19:
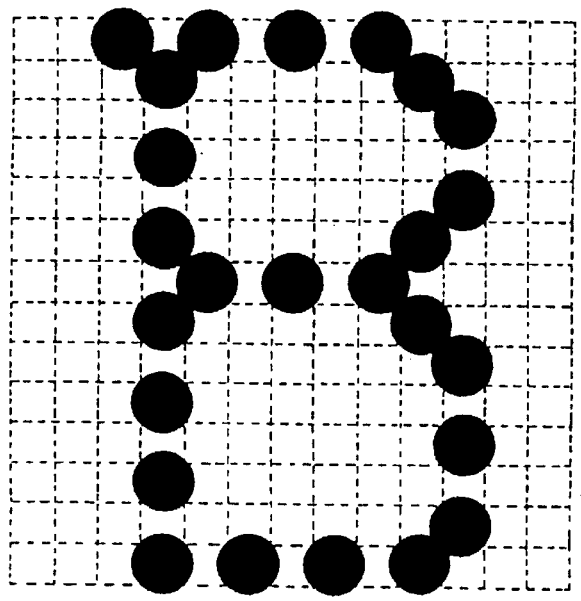
FIG. 19 illustrates an ink-saving-printing-mode printed character and a high-speed-printing-mode printed character formed by a conventional an ink ejecting printing apparatus.
Figure 20:
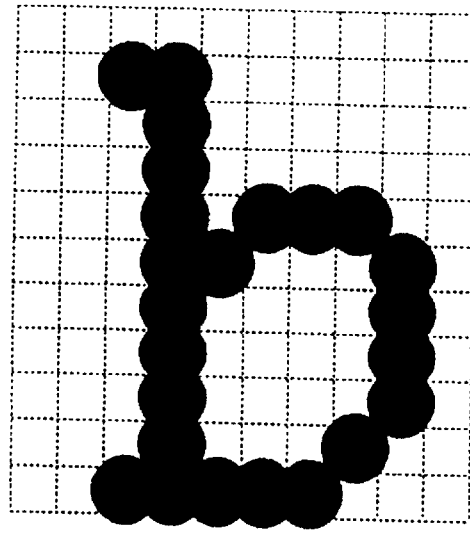
FIG. 20 illustrates another normal printing mode printed character formed by the conventional ink ejecting printing apparatus.
Figure 21:
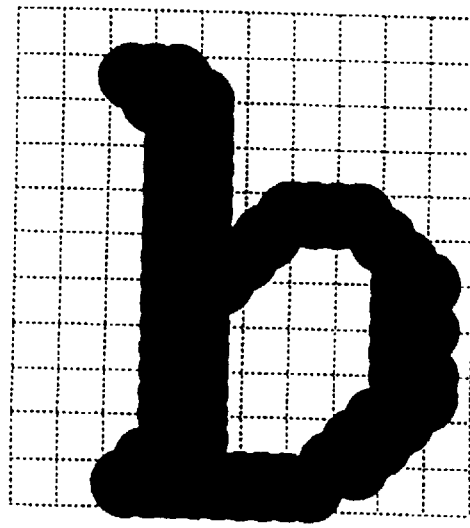
FIG. 21 illustrates a high-quality-printing-mode printed character formed by the conventional ink ejecting printing apparatus.

The frequency of the serial data signal in the high quality printing mode is double the frequency of that in the normal printing mode, while the rotating angle of the platen 61 is ½ the rotating angle of the normal printing mode, so that printing is performed the same dot pitch in the main scanning direction as that in the sub-scanning direction, and one-half the dot pitch of the normal printing mode in the sub-scanning direction, as shown in FIG. 17.

As described above, in the normal printing mode, two cycles of the fire signal are output for each set of serial data, the dot pitch in the main scanning direction is ½ the dot pitch in the sub-scanning direction and each set of printing data includes two dots. On the other hand, in the case of the high quality printing mode, one cycle of the fire signal is output for each set of printing data and the dot pitch in sub-scanning direction is set to the same dot pitch as in the main scanning direction, so that when a proper ink quantity of the ink drops is set, independently of the printing mode, good quality printing can be obtained without using a special printing paper.

In the normal printing mode, two cycles of the fire signal are output for each set of printing data, but three or more cycles of the fire signal can be output for each set of printing data. In the high quality printing mode, one cycle of the fire signal is output for each set of serial data, but all that is required is that a smaller number of cycles of the fire clock signal than those in the normal printing mode are output for each set of serial data.

The frequency of the fire clock signal in the high quality printing mode is the same as that in the normal printing mode. However, when the frequency of the fire clock signal in the high quality printing mode is made to be N times the frequency of the serial signal in the normal printing mode, the carriage speed in the high quality printing mode is N times the carriage speed in the normal printing mode, where N is any real number.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An ink ejecting printing apparatus, comprising:
   an ink ejecting print head having a plurality of nozzles for ejecting ink drops into a recording medium;
   control means for outputting a plurality of sets of dot printing signals and at least one fire signal for each set of dot printing signals, each dot printing signal of a set of dot printing signals corresponding to one of the plurality of nozzles;
   pulse signal output means for outputting a plurality of pulse signals, each pulse signal corresponding to one of the plurality of nozzles and determined based on the corresponding dot printing signal of one set of dot printing signals;
   nozzle driving means for driving the plurality of nozzles, each nozzle driven based on a corresponding one of the plurality of pulse signals and the at least one fire signal; and
   printing mode setting means for setting one of a first printing mode and a second printing mode, wherein a number of fire signals input to the nozzle driving means for each set of dot printing signals in the first printing mode is different than a number of fire signals input to the nozzle driving means for each set of dot printing signals in the second printing mode.

2. The ink ejecting printing apparatus of claim 1, wherein the printing mode setting means comprises:
   frequency conversion means for inputting a first fire signal having a first frequency and outputting a second fire signal having a second frequency; and
   switch means for inputting the first fire signal and the second fire signal and selectively outputting one of the first fire signal and the second fire signal to the nozzle driving means as the at least one fire signal based on the set printing mode.

3. The ink ejecting printing apparatus of claim 2, wherein the control means outputs a switch control signal to the switch means to set one of the first printing mode and the second printing mode.

4. The ink ejecting printing apparatus of claim 3, further comprising input means for inputting a setting signal to the control means, a state of the switch control signal output by the control means based on the setting signal.

5. The ink ejecting printing apparatus of claim 2, wherein the frequency conversion means outputs the second fire signal at a frequency N times the frequency of the first fire signal, where N is any real number.

6. The ink ejecting printing apparatus of claim 1, wherein the pulse signal output means comprises a serial-to-parallel converter, each dot printing signal of a set of dot printing signals comprising a portion of a serial signal, the serial-to-parallel converting the portions of the serial signal corresponding to a set of dot printing signals to a plurality of parallel signals.

7. The ink ejecting printing apparatus of claim 1, wherein the nozzle driving means comprises a plurality of driving circuits, each driving circuit comprising a serially connected AND gate and a driver, each driving circuit inputting one of the plurality of pulse signals and at least one fire signal and outputting a driving signal to a corresponding one of the plurality of nozzles.

8. The ink ejecting printing apparatus of claim 1, wherein the control means comprises a microprocessor.

9. The ink ejecting printing apparatus of claim 1, wherein, in the first printing mode, a first number of driving signals having different impact points of ink drops on the recording medium are output for each pulse signal output from said pulse signal output means, and, in the second printing mode, a second number of driving signals are output for each pulse signal, wherein the first number of driving signals is greater than the second number of driving signals.

10. The ink ejecting printing apparatus of claim 9, wherein, in the first printing mode, a dot pitch in a main scanning direction is different than the dot pitch in a sub-scanning direction, and, in the second printing mode, the dot pitch in the main scanning direction is the same as the dot pitch in the subscanning direction.

11. The ink ejecting printing apparatus of claim 1, wherein the number of fire signals input to the nozzle driving means for each set of dot printing signals in the first printing mode is greater than the number of fire signals input to the nozzle driving means for each set of dot printing signals in the second printing mode.

12. An ink ejecting printing apparatus comprising:
an ink ejecting print head having a plurality of nozzles for ejecting ink drops into a recording medium;
a control circuit that outputs a plurality of sets of dot printing signals and at least one fire signal for each set of dot printing signals, each dot printing signal of a set of dot printing signals corresponding to one of the plurality of nozzles;
a pulse signal output circuit that outputs a plurality of pulse signals, each pulse signal corresponding to one of the plurality of nozzles and determined based on the corresponding dot printing signal of one set of dot printing signals; and
a nozzle driving circuit that drives the plurality of nozzles, each nozzle driven based on a corresponding one of the plurality of pulse signals and the at least one fire signal;
wherein, in a first printing mode, the control circuit outputs a first number of fire signals for each set of dot printing signals, and, in a second printing mode, the control circuit outputs a second number of fire signals for each set of dot printing signals, wherein the first number of fire signals for each set of dot printing signals is different than the second number of fire signals for each set of dot printing signals.

13. The ink ejecting printing apparatus of claim 12, wherein the control circuit outputs the at least one fire signal at a constant frequency, and outputs the sets of dot printing signals at a first frequency in the first printing mode and outputs the sets of dot printing signals at a second frequency in the second printing mode, wherein the first frequency is different that the second frequency.

14. The ink ejecting printing apparatus of claim 13, wherein the first frequency is less than the second frequency.

15. The ink ejecting printing apparatus of claim 13, wherein the second frequency is N times the first frequency, where N is any real number.

16. The ink ejecting printing apparatus of claim 12, wherein the control circuit outputs the sets of dot printing signals at a constant frequency, and outputs the at least one fire signal at a first frequency in the first printing mode and outputs the at least one fire signal at a second frequency in the second printing mode, wherein the first frequency is different that the second frequency.

17. The ink ejecting printing apparatus of claim 16, wherein the first frequency is greater than the second frequency.

18. The ink ejecting printing apparatus of claim 12, wherein the control circuit comprises:
a control signal generating circuit that generates the sets of dot printing signals and the at least one fire signal; and
a printing mode setting circuit by which one of the first printing mode and the second printing mode can be selected, wherein a number of fire signals output by the print mode setting circuit to the nozzle driving circuit for each set of dot printing signals in the first printing mode is different than a number of fire signals output by the print mode setting circuit to the nozzle driving circuit for each set of dot printing signals in the second printing mode.

19. The ink ejecting printing apparatus of claim 18, wherein the number of fire signals output by the print mode setting circuit in the first printing mode is greater than the number of fire signals output by the print mode setting circuit in the second printing mode.

20. The ink ejecting printing apparatus of claim 12, wherein, in the first printing mode, a first number of driving signals having different impact points of ink drops on the recording medium are output for each pulse signal output from said pulse signal output circuit, and, in the second printing mode, a second number of driving signal are output for each pulse signal, wherein the first number of driving signals is greater than the second number of driving signals.

21. The ink ejecting printing apparatus of claim 20, wherein, in the first printing mode, a dot pitch in a main scanning direction is different than the dot pitch in a sub-scanning direction, and, in the second printing mode, the dot pitch in the main scanning direction is the same as the dot pitch in the subscanning direction.

22. An ink ejecting printing apparatus, comprising:
an ink ejecting print head having a plurality of nozzles for ejecting ink drops onto a recording medium;
a control circuit that outputs a plurality of sets of dot printing signals and at least one fire signal for each set of dot printing signals, each dot printing signal of a set of dot printing signals corresponding to one of the plurality of nozzles;
a pulse signal circuit that inputs the plurality of sets of dot printing signals and outputs a plurality of pulse signals, each pulse signal corresponding to one of the plurality of nozzles;
a driving circuit that inputs the plurality of pulse signals and the at least one fire signal and outputs a plurality of driving signals, each driving signal input to and driving a corresponding one of the plurality of nozzles;
a printing mode setting circuit by which one of a first printing mode and a second printing mode is selected, wherein a number of fire signals input to the driving circuit for each set of dot printing signals in the first printing mode is different than a number of fire signals input to the driving circuit for each set of dot printing signals in the second printing mode.

23. The ink ejecting printing apparatus of claim 22, further comprising a head scanning device that relatively moves the ink ejecting print head and the recording medium at a first speed when the first printing mode is set by the printing mode setting circuit and relatively moves the ink ejecting printing head and the recording medium at a second speed when the second printing mode is set by the printing mode setting circuit, wherein the first speed is different than the second speed.

24. The ink ejecting printing apparatus of claim 23, wherein the number of fire signals input to the driving circuit for each set of dot printing signals in the first printing mode is greater than the number of fire signals input to the driving circuit for each set of dot printing signals in the second printing mode, and the second speed of the ink ejecting printing head is faster than the first speed of the ink ejecting printing head.

25. The ink ejecting printing apparatus of claim 23, wherein, when the second printing mode is set:
the printing mode setting circuit outputs a second fire signal at a frequency N times the frequency of a first fire signal when the first printing mode is set; and
the head scanning device relatively moves the ink ejecting printing head and the recording medium at a speed N times the first speed when the first printing mode is set.

26. The ink ejecting printing apparatus of claim 22, wherein, in the first printing mode, a first number of driving signals having different impact points of ink drops on the recording medium are output for each pulse signal from said pulse signal circuit, and, in the second printing mode, a second number of driving signal are output for each pulse signal, wherein the first number of driving signals is greater than the second number of driving signals.

27. The ink ejecting printing apparatus of claim 26, wherein, in the first printing mode, a dot pitch in a main scanning direction is different than the dot pitch in a sub-scanning direction, and, in the second printing mode, the dot pitch in the main scanning direction is the same as the dot pitch in the subscanning direction.

28. The ink ejecting printing apparatus of claim 22, wherein a quantity of the ink drops ejected in the second printing mode is different than a quantity of the ink drops ejected in the first printing mode.

29. The ink ejecting printing apparatus of claim 28, wherein the quantity of the ink drops ejected in the second printing mode is greater than the quantity of the ink drops ejected in the first printing mode.

30. An ink ejecting printing apparatus comprising:
an ink ejecting print head having a plurality of nozzles for ejecting ink drops onto a recording medium;
a control circuit that outputs a plurality of sets of dot printing signals and at least one fire signal for each set of dot printing signals, each dot printing signal of a set of dot printing signals corresponding to one of the plurality of nozzles;
a pulse signal output circuit that outputs a plurality of pulse signals, each pulse signal corresponding to one of the plurality of nozzles and determined based on a corresponding one of the set dot printing signals;
a nozzle driving circuit that drives the plurality of nozzles, each nozzle driven by a driving signal determined based on a corresponding one of the plurality of pulse signals and the at least one fire signal; and
a printing mode setting circuit by which one of a first printing mode having a first resolution and a second printing mode having a second resolution is selected, wherein the second resolution is different from the first resolution;
wherein the nozzle driving circuit outputs a first number of the driving signals having different impact points of ink drops for each pulse signal output from the pulse signal output circuit when the first printing mode is set and outputs a second number of driving signals having different impact points of ink drops for each pulse signal output from the pulse signal output circuit when the second printing mode is set, and the second number of driving signals is different than the first number of driving signals.

31. The ink ejecting printing apparatus of claim 30, wherein the recording density of the second resolution is higher than the recording density of the first resolution and the first number of driving signals is greater than the second number of driving signals.

32. The ink ejecting printing apparatus of claim 30, wherein, in the first printing mode, a first number of driving signals having different impact points of ink drops on the recording medium are output for each pulse signal output from said pulse signal output circuit, and, in the second printing mode, a second number of driving signal are output for each pulse signal, wherein the first number of driving signals is greater than the second number of driving signals.

33. The ink ejecting printing apparatus of claim 32, wherein, in the first printing mode, a dot pitch in a main scanning direction is different than the dot pitch in a sub-scanning direction, and, in the second printing mode, the dot pitch in the main scanning direction is the same as the dot pitch in the subscanning direction.

* * * * *